Nov. 24, 1953
T. STIGUM ET AL
2,660,450
BEAM SUSPENSION FOR VEHICLES
Filed March 29, 1949
2 Sheets-Sheet 1
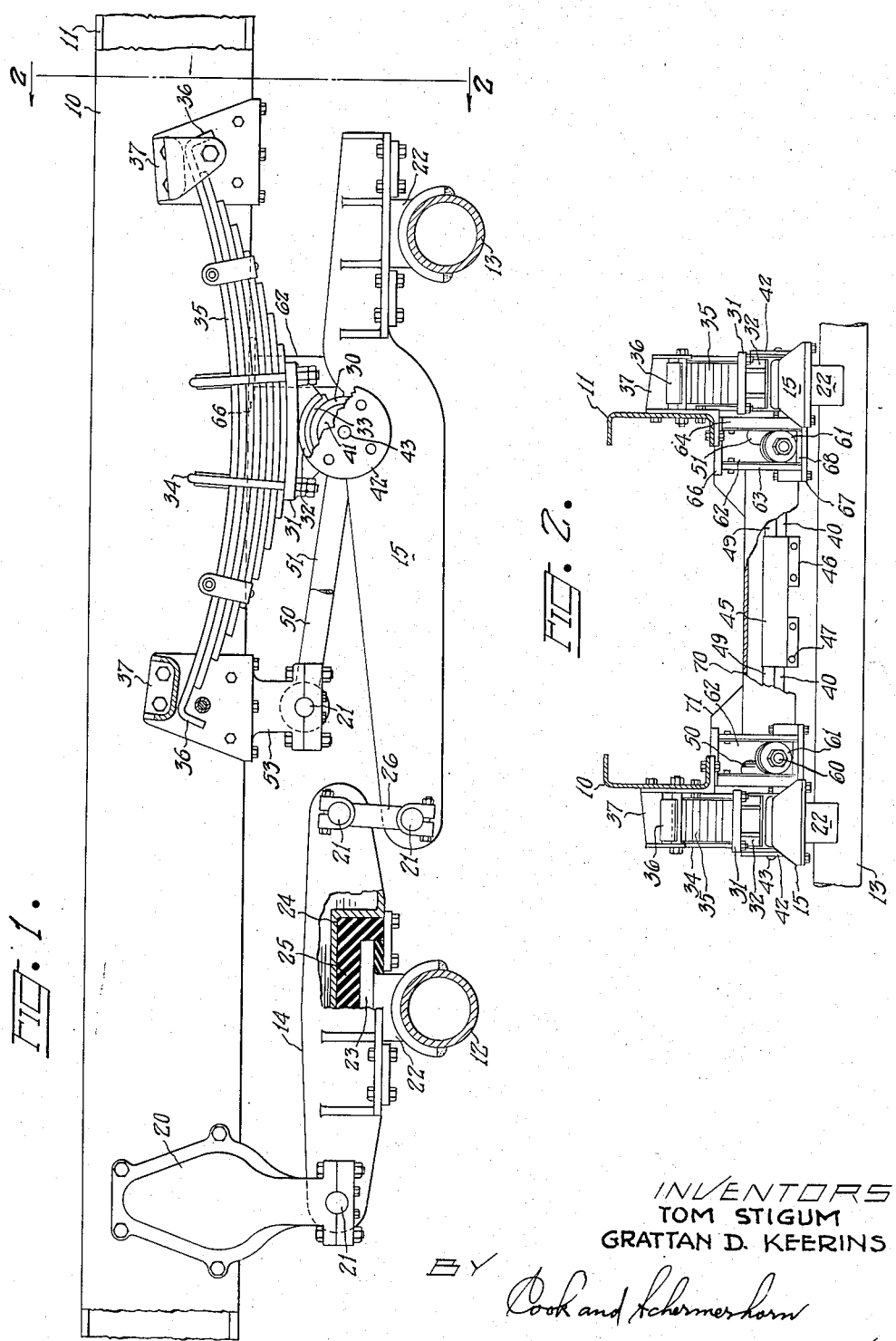
INVENTORS
TOM STIGUM
GRATTAN D. KEERINS
BY Cook and Schermerhorn
ATTORNEYS

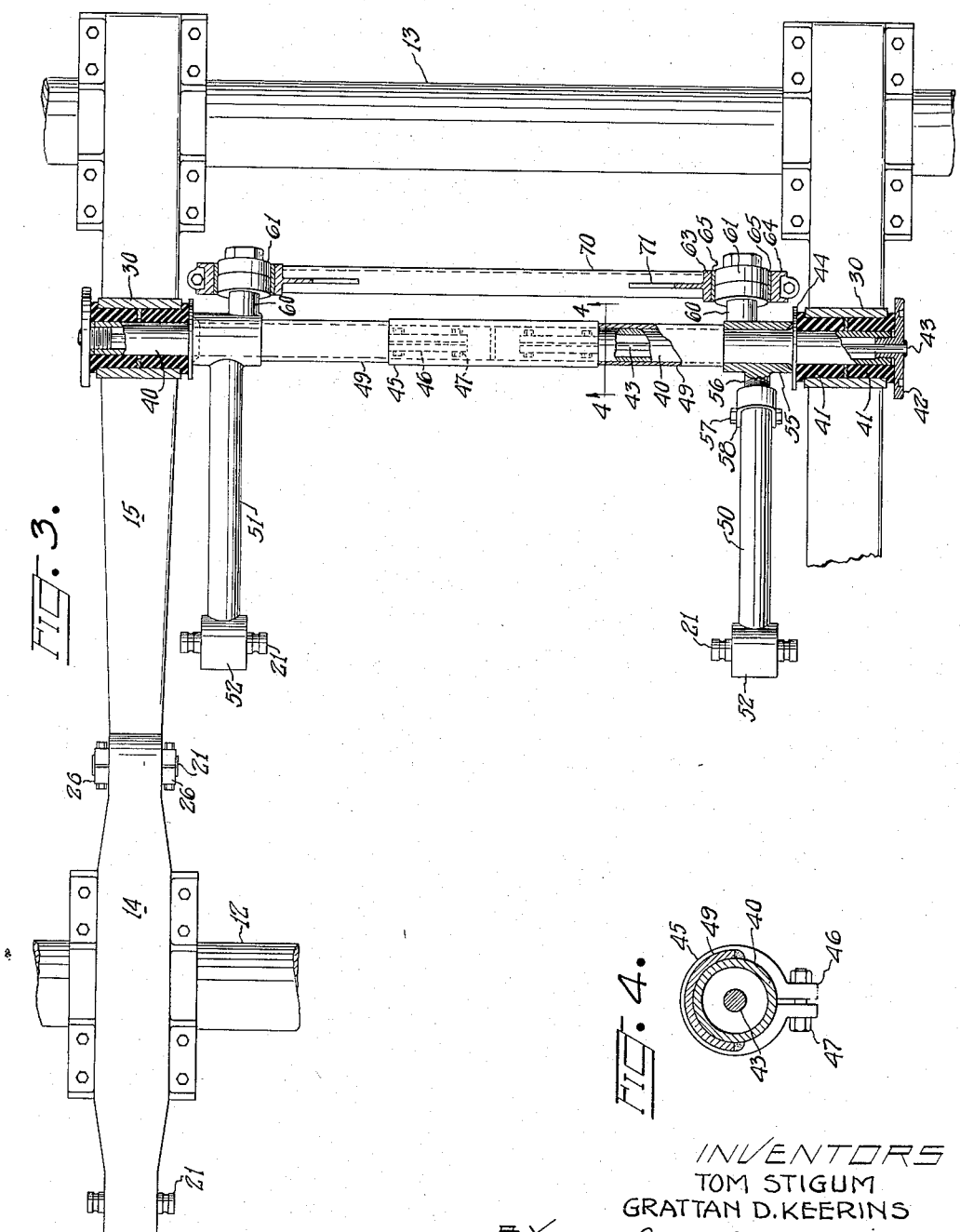

Patented Nov. 24, 1953

2,660,450

UNITED STATES PATENT OFFICE 2,660,450

BEAM SUSPENSION FOR VEHICLES

Tom Stigum, Portland, and Grattan D. Keerins, West Linn, Oreg., assignors to Pointer-Willamette Company, Inc., Portland, Oreg., a corporation of Oregon Application March 29, 1949, Serial No. 84,188

5 Claims. (Cl. 280—104.5)

This invention relates to improvements in beam suspensions in the running gear of vehicles, and has particular application to the type of beam suspension disclosed and claimed in the copending application of Robert W. Pointer, Serial No. 632,549, filed December 3, 1945, for Beam Suspension for Vehicles, now Patent No. 2,493,025, issued January 3, 1950.

The type of beam suspension to which the invention is applied in the present disclosure comprises a pair of longitudinal interconnected walking beams on each side of the vehicle to support the rear end of the vehicle on dual axles wherein each axle is connected near each end to one of the beams. This type of suspension is known in the art as a dual beam, dual axle suspension. The beams of each pair on the same side of the vehicle are interconnected in such a manner with respect to the axle mountings as to neutralize the brake torque reactions of the wheels and to enable the use of a single resilient spring assembly on each side of the vehicle to serve each pair of interconnected beams. The arrangement is such that the beams of each pair have articulating relative movement independent of the spring action, and also have additional relative movement by deflection of the spring. The principal features of the invention, however, may also be applied to other beam arrangements.

General objects of the present invention are to provide improved means for holding the beams in the proper relation to the frame of the vehicle in their various movements, to provide means for this purpose exclusive of the load carrying members, and to include in such means a transverse trunnion shaft for the beams. More particular objects are to provide a novel form of radius arms connected with the trunnion shaft and to provide a novel form of vertical guide means cooperating with the radius arms to resist side thrusts.

These and other objects will become apparent and the invention will be better understood from the description in the following specification of a preferred embodiment illustrated in the accompanying drawings. It is to be understood, however, that various changes may be made in the construction and arrangement of parts, and that certain features of the disclosure may be used without others.

In the drawings:

Figure 1 is a side elevation view of the beam suspension with parts broken away;

Figure 2 is a cross sectional view taken on the line 2—2 of Figure 1;

Figure 3 is a plan view of the suspension with parts removed and parts shown in section; and Figure 4 is a cross sectional view through the trunnion shaft, taken on the line 4—4 of Figure 3.

The present beam suspension is mounted on the longitudinal frame members 10 and 11 of the vehicle. The structure disclosed is a dual beam, dual axle suspension for the rear ends of full trailers and semi-trailers, but it will be apparent to persons skilled in the art that some features of the present construction may be adapted to other beam arrangements, and other features may be adapted to a truck construction where either one or both of the rear axles is a driving axle. The beam 14 is referred to as a front beam and the beam 15 is referred to as a rear beam, and similarly, the axle 12 is referred to as a front axle, and the axle 13 is referred to as a rear axle, but it is to be understood that these terms are only relative in order to facilitate the description inasmuch as both axles and beams are ordinarily mounted at the rear of the vehicle on which the construction is used. The beams 14 and 15 are duplicated at the opposite sides of the frame whereby the axle 12 is mounted near its ends on the two opposite beams 14 and the axle 13 is mounted near its ends on the two opposite beams 15.

The front end of the front beam 14 is pivotally connected with a rigid bracket 20 on the vehicle frame by means of a rubber bushed shackle pin 21 to provide a resilient support for the frame member at this point. Welded on the top side of the axle 12 is a T-casting 22 having a flat horizontal plate 23 enclosed within a chamber 24 in the beam 14. The plate 23 does not engage the walls of the chamber 24, but it is surrounded by rubber cushion blocks 25 on all sides to provide a resilient mounting allowing limited universal movement for the end of the axle. The chamber 24 and its resilient mounting is referred to as an axle cushion seat. In the front beam the axle cushion seat is in approximately the mid portion of the beam.

The rear end of the front beam 14 is pivotally interconnected with the front end of the rear beam 15 by means of a shackle 26 equipped with a pair of the rubber bushed shackle pins 21. The rear axle 13 is resiliently mounted near the rear end of the rear beam in an axle cushion seat of the same type just described for the axle 12.

Intermediate its ends and preferably at a point approximately one-third the distance from the axle 13 to the shackle 26, the rear beam 15 is provided with a trunnion 30. The trunnion 30 is tubular and has a semi-cylindrical bearing surface rising above the top side of the beam to form in effect a portion of a journal integral with the beam. Resting on the trunnion 30 is a spring rider 31 having an arcuate bearing 32 equipped with a bushing 33 to fit the trunnion. The arcuate extent of this bearing and its bushing is somewhat less than the arcuate extent of the bearing surface of the trunnion 30 to allow for rocking movement of the beam.

Clamped upon the top side of the spring rider 31 by means of a pair of U-bolts 34 is a leaf spring 35. The spring 35 has ends 36 which are free in the sense that they are not attached to any other part. The ends 36 bear against suitable spring seats in a pair of brackets 37 attached to the vehicle frame member whereby the frame is supported on the spring. The spring ends 36 are confined within these brackets to prevent their being displaced from the bracket seats but have free movement with respect to the brackets to allow them to slide on the seats under deflection of the spring.

It will thus be apparent that the weight of the vehicle on each frame member is supported at one point by the bracket 20 on the front walking beam and at a second point by the spring rider 31 on the rear walking beam trunnion 30. By reason of the pivotal interconnection of the beams 14 and 15 through the shackle 26, the two axles can rise and fall to adjust themselves to an uneven ground surface without requiring any deflection of the spring 35. The spring, however, supports a major portion of the load and is effective through the interconnection of the two beams to provide spring action to resist impact or shock loads on both axles. When a wheel on the front axle 12 rides over a bump, the raising of this axle lifts the front end of the rear beam 15, which in turn lifts the trunnion 30 if the rear axle does not drop at the same time. When a wheel on the rear axle 13 rides over a bump, the rear end of the beam 15 is lifted to lift the trunnion 30 in the same manner. It will also be observed that the beams 14 and 15 are interconnected in such a manner as to neutralize the torque reactions of the wheels without depending on another member to perform this function. The brake torque reaction of the rear wheels produces a turning moment in the rear beam about the axis of the trunnion 30 to exert a downward force on the front end of this beam. This force and moment are counteracted by an upward brake torque reaction on the rear end of the front beam 14 acting through shackle 26. In a quick stop, the wheels on both axles 12 and 13 maintain their intended bearing and load distribution on the road surface.

The rear beams 15 on opposite sides of the vehicle are interconnected by a tansverse tubular trunnion shaft 40. The opposite ends of the trunnion shaft 40 are mounted in rubber bushings 41 in the cylindrical trunnions 30, so that the trunnion shaft is concentric with the normal axis of oscillation of the two rear beams. The bushings 41 have sufficient resilience to permit a limited amount of twisting of the beams under shock loads and on uneven ground surfaces, but they exert a restraining influence on these beams and tend to return them to their normal positions with their trunnions 30 in alignment. The outer ends of the bushing elements are preferably equipped with flanges extending over the ends of the tubular trunnion 30 and these bushing ends are engaged and compressed between a large circular nut 42 on the end of the trunnion shaft and a washer or collar 44 which is welded to the shaft to form an abutment thereon. A lock rod 43 has ends extended through the nuts 42 at the opposite ends of the shaft and welded to the nuts to prevent their loosening.

The trunnion shaft 40 is preferably made in two sections which have their inner ends secured rigidly together in the center of the vehicle by a coupling 45. This coupling has pairs of ears 46 to receive bolts 47 to tighten the device as a clamp on the ends of the trunnion shaft sections. The use of the coupling 45 facilitates assembly or disassembly and permits adjustment in the length of the trunnion shaft to fit the vehicle. A trunnion shaft spacer 49 is tack welded or bolted on each section of the trunnion shaft 40 abutting one end of coupling 45. In the present embodiment the spacers 49 are semi-cylindrical to fit the trunnion shaft.

Inasmuch as the spring riders 31 merely rest upon the trunnions 30 and the spring ends float in their brackets 37, other means must be provided to hold the rear beams 15 in position longitudinally and transversely of the vehicle. Both the longitudinal and transverse holding functions are accomplished by a pair of radius arms 50 and 51, the arm 50 being adjustable in length and the arm 51 being of fixed length. The forward end of each radius arm is equipped with a transverse sleeve 52 to receive the rubber bushing on a shackle pin 21 which is mounted at its ends in a bracket 53 attached to the frame of the vehicle. The lower end of each radius arm is equipped with a transverse sleeve 55 having an internal bore to fit the trunnion shaft 40 for relative rotation. The sleeve 55 for the adjustable radius arm 50 is equipped with a screw threaded shank 56 to screw into an internally threaded end on the radius arm. The parts are made rigid in the desired length adjustment by tightening a bolt 57 on a clamp 58 encircling the end of the radius arm.

Each sleeve 55 also carries a stud 60 on the opposite side from the shank 56. The studs 60 are equipped with a roller 61 for travel in vertical guide boxes 62. Each guide box 62 comprises a pair of vertical members 63 and 64 faced with wear plates 65 to engage the rollers 61. The upper ends of the members 63 and 64 depend from a top plate 66 which provides a means of attachment for the guide box to the under side of the vehicle frame. The opening between the lower ends of these members is closed by a retainer plate 67 which is equipped with a resilient rebound pad 68 to act as a buffer for the rollers at the bottom of the guide box. The two guide boxes 62 are braced across the vehicle by a cross brace 70 having a gusset plate 71 at each end, these end parts being welded solidly to the guide boxes.

The radius arm sleeves 55 are disposed on the trunnion shaft 40 between the collars 44 and the ends of spacers 49 whereby it will be seen that the two sleeves 55 are separated by the solid combined length of the two spacers 49 and the coupling 45. These parts provide solid abutments on the trunnion shaft for fixing the spacing of the rear beams 15 and sleeves 55 so that they cannot move axially on the trunnion shaft. By these means the beams 15 are maintained in their proper spacing and positions so that they cannot shift laterally when subjected to side thrusts. Inwardly directed side thrusts on a rear beam 15 are thereby transmitted through the flange of bushing 41 and collar 44 directly to a radius arm sleeve 55. The guide boxes 62 constrain the radius arms 50 and 51 to vertical pivotal movement and are rigidly braced by cross brace 70 and gussets 71 to transfer the side thrust to both longitudinal frame members of the vehicle. Outwardly directed side thrusts on a beam are transmitted through the trunnion shaft to the radius arms and guide boxes.

Thus the rear walking beams 15 are held in position both longitudinally and transversely of the vehicle by the radius arms so that the springs 35 are subjected only to vertical forces produced by the weight of the load. It is to be noted that all of the vertical forces are brought to bear directly and externally on the trunnions 30, which are integral with the beams, so that the trunnion shaft 40 carries no load. Further, by virtue of the torque neutralizing connections between the front and rear beams no torque reactions are transmitted to the trunnion shaft or radius arms. In this way the walking beams are maintained resiliently in parallelism without interfering with the spring action or the complex movements of the beams as they adjust themselves to uneven road surfaces.

Having now described our invention and in what manner the same may be used, what we claim as new and desire to protect by Letters Patent is:

1. In a vehicle suspension, a pair of walking beams, one on each side of the vehicle, means for supporting the vehicle on said beams, resilient bushings in said beams, a transverse shaft mounted in said bushings to interconnect said beams, radius arms pivotally connected to the vehicle and connected with said shaft, rollers on said arms, and a guide box for each of said arms having vertical walls on opposite sides of said rollers to guide said arms in vertical movement.

2. In a vehicle suspension, a pair of walking beams, one on each side of the vehicle, resilient means for supporting the vehicle on said beams, a pair of radius arms pivotally connected to the vehicle and having transverse sleeves, a transverse shaft in said sleeves interconnecting said beams, said arms having end portions extending beyond said sleeves, rollers on said end portion and a guide box for each radius arm mounted on the frame of the vehicle and having vertical walls engaging opposite sides of said rollers to guide said arms in vertical movement.

3. In a vehicle suspension having walking beams on opposite sides of the vehicle interconnected by a transverse guide shaft resiliently mounted at its ends in said beams, and resilient means for supporting the vehicle on said beams; a pair of radius arms each pivotally connected at one end to the vehicle and pivotally connected at the other end with said guide shaft, rollers on said radius arms, and vertical guide means on the vehicle engaging opposite sides of the rollers on each arm to resist side thrust.

4. In a vehicle suspension having longitudinal axle carrying walking beams on opposite sides of the vehicle equipped with tubular trunnions and interconnected by a transverse guide shaft resiliently mounted at its ends in said trunnions, longitudinal leaf springs having their central portions mounted on arcuate bearings resting on said trunnions and having free end portions, spring seats on the vehicle resting loosely on said free end portions of the springs, a pair of radius arms each pivotally connected at one end to the vehicle and pivotally connected at the other end with said guide shaft, rollers on said radius arms, and vertical guide means on the vehicle engaging opposite sides of the rollers on each arm to resist side thrust.

5. In a vehicle suspension having longitudinal axle carrying walking beams on opposite sides of the vehicle equipped with tubular trunnions and interconnected by a transverse guide shaft resiliently mounted at its ends in said trunnions, arcuate bearings resting on said trunnions, longitudinal leaf springs having their central portions mounted on said trunnion bearings, free end portions on said springs, spring seats on the vehicle resting loosely on said free end portions, and a pair of radius arms each pivotally connected at one end to the vehicle and pivotally connected at the other end with said guide shaft.

TOM STIGUM.
GRATTAN D. KEERINS.

References Cited in the file of this patent

UNITED STATES PATENTS

| Number | Name | Date |
| --- | --- | --- |
| 1,915,303 | Forsyth | June 27, 1933 |
| 1,985,414 | Judd | Dec. 25, 1934 |
| 2,103,381 | Perkins et al. | Dec. 28, 1937 |
| 2,169,242 | Hickman | Aug. 15, 1939 |
| 2,456,719 | Martin | Dec. 21, 1948 |
| 2,493,025 | Pointer | Jan. 3, 1950 |
| 2,493,026 | Pointer | Jan. 3, 1950 |